United States Patent

[11] 3,537,570

[72] Inventor Frederick S. Sillars
 Beverly, Massachusetts
[21] Appl. No. 731,771
[22] Filed May 24, 1968
[45] Patented Nov. 3, 1970
[73] Assignee USM Corporation
 Flemington, New Jersey
 a corporation of New Jersey

[54] APPARATUS FOR CONVEYING TUBULAR ARTICLES
 7 Claims, 11 Drawing Figs.
[52] U.S. Cl. .................................................. 198/170,
 198/174, 198/179
[51] Int. Cl. .................................................. B65g 19/02,
 B65g 17/46
[50] Field of Search ........................................ 198/170,
 174, 131, 179

[56] References Cited
 UNITED STATES PATENTS
2,530,412 11/1950 Wallace .................... 198/179
2,773,584 12/1956 Densmore ................. 198/170
2,959,272 11/1960 Jones ........................ 198/170
 FOREIGN PATENTS
1,342,013 12/1962 France ..................... 198/170

Primary Examiner—Evon C. Blunk
Assistant Examiner—Roger S. Gaither
Attorneys—W. Bigelow Hall, Richard A. Wise and George C. Fuller ABSTRACT: Apparatus for conveying tubular articles, for example, can bodies, in coaxial succession along a predetermined path, comprises a conveyor chain having spaced lugs pivoted thereon and having legs for engaging end portions of the articles, the lugs being formed with article-entering projections from the legs for stabilizing the articles during transit.

Inventor
Frederick S. Sillars
By his Attorney
George C. Fuller

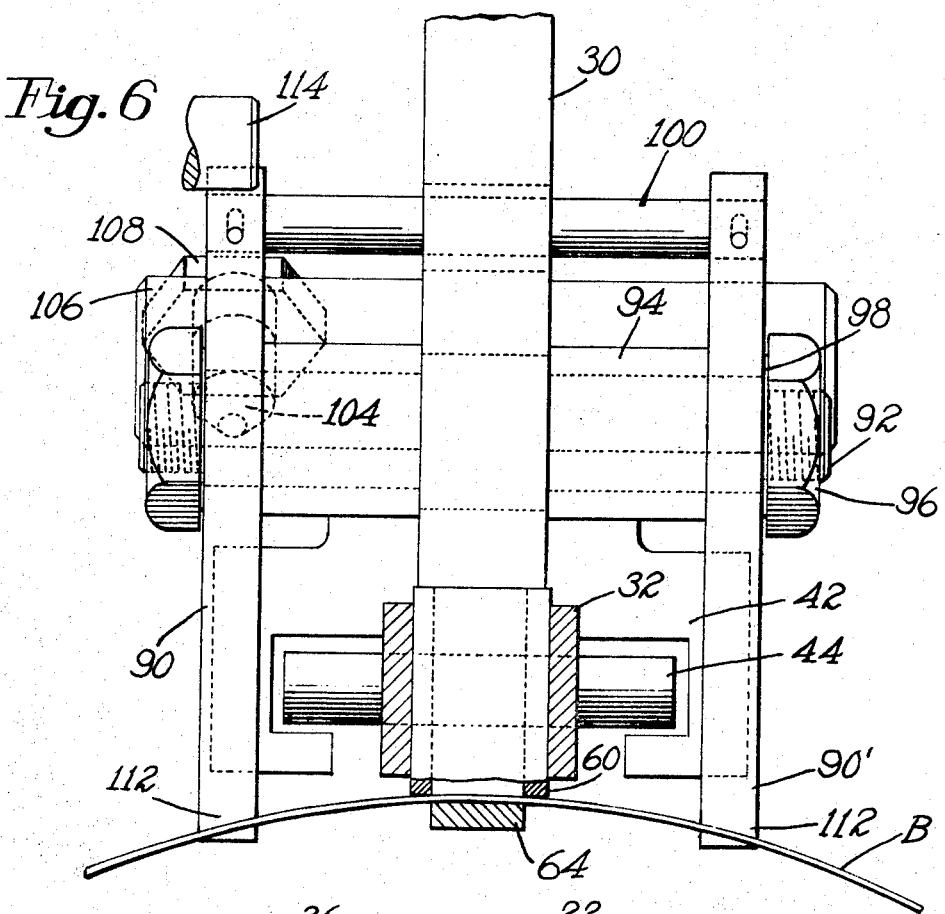
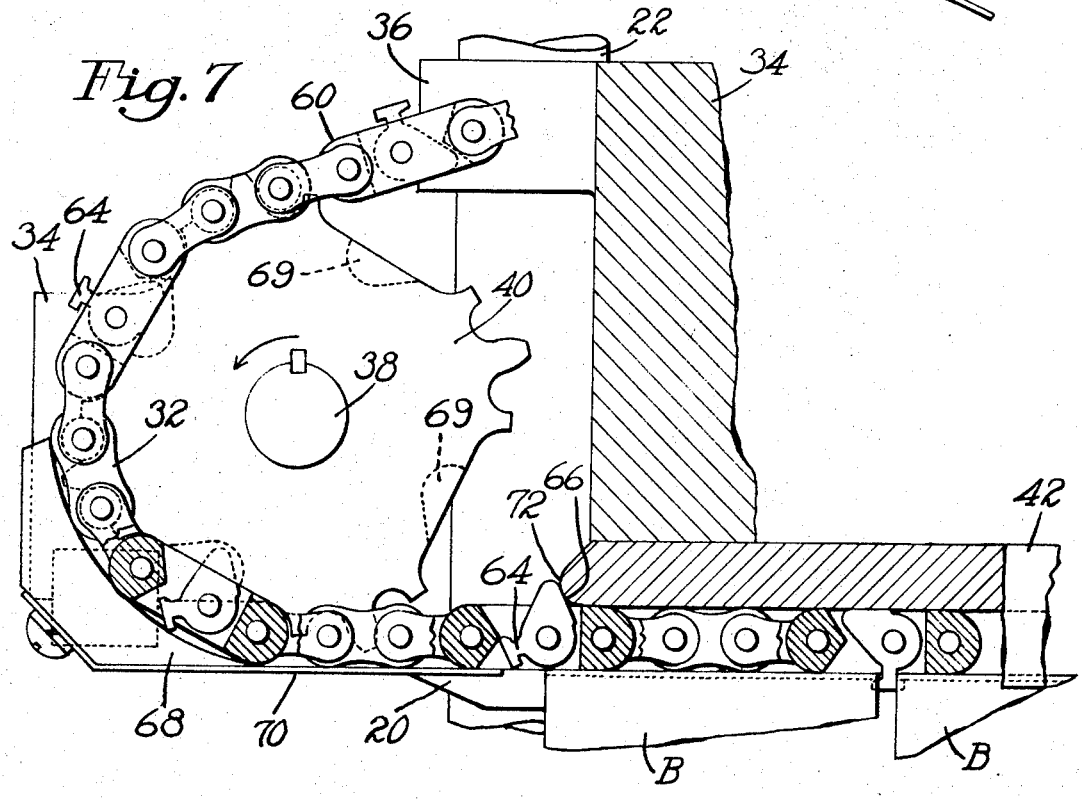

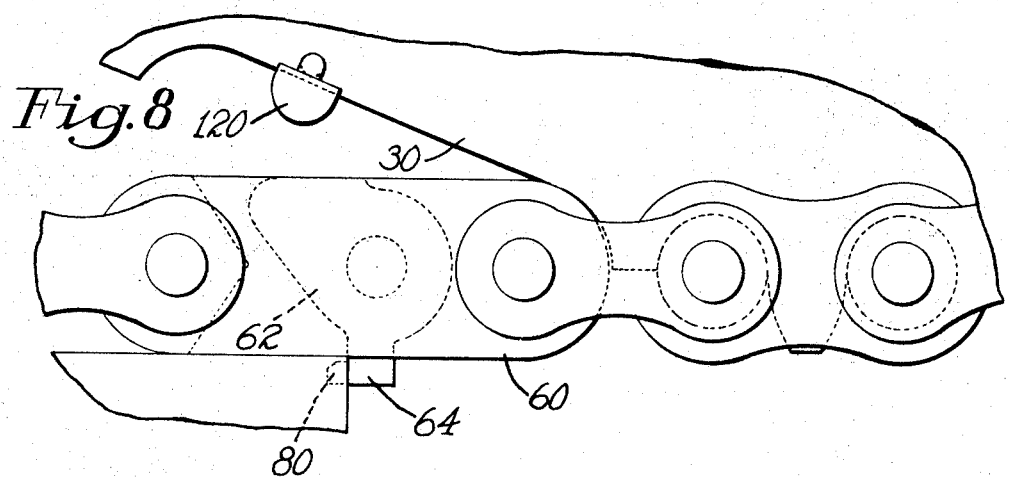
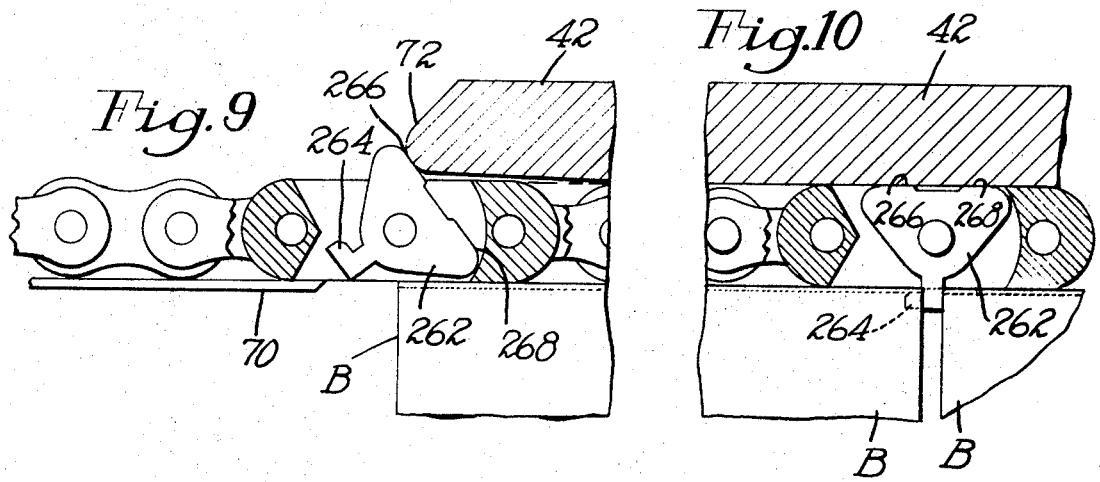
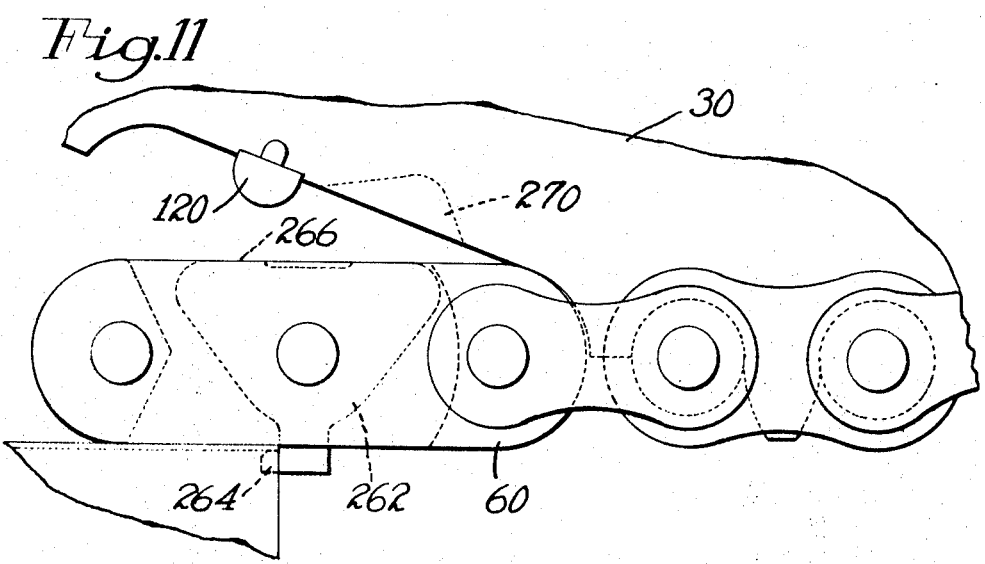

3,537,570

1

APPARATUS FOR CONVEYING TUBULAR ARTICLES

BACKGROUND OF THE INVENTION

1. Field of the Invention

This invention relates to apparatus for conveying articles and more specifically to apparatus for conveying open-ended tubular articles such as can bodies in coaxially related succession along a predetermined path, for example, in the performance of operations upon the articles.

The invention is illustrated as embodied in a side seam soldering machine of the type illustrated and described in U.S. Pat. No. 3,056,368, issued Oct. 2, 1962, on an application in the name of the present inventor, but it will be understood that in its more general aspects the invention is not limited to machines of that particular character nor to the manufacture of cans.

2. Description of the Prior Art

In the apparatus of the aforesaid patent, can bodies are conveyed in coaxial succession along a predetermined path of travel from a receiving station to a discharge station. The conveyor means comprises a conveyor chain having spaced drive links carrying drive lugs having legs engagable with trailing edges of the can bodies to push them along V-guides through soldering means and thence to a moving lap depressor chain having lugs for flattening the soldered seams.

One problem is conveying tubular articles by such means arises where the articles have a relatively large ratio of diameter to axial length wherein the diameter may, for example, equal or exceed the length of the article. Where such articles are urged along slide supports by drive lugs of a conveyor chain disposed on the opposite side of the articles, the latter are subject to "tumbling", or rocking back and forth, because of friction or surface irregularities of the slide support. This situation is exemplified in the apparatus of the aforesaid patent where can bodies are supported on a slideway formed by V-shaped guides while traveling through the soldering station. Such tumbling can spoil the articles, can jam the articles between the conveyor chain and the guides with attendant damage to the chain and guides, or can result in costly downtime of the machine for clearing a stuck article.

Another problem is conveying such articles, particularly in the course of performing operations thereon, is axial rotation of the articles in the course of their movement along the conveyor. This problem, not confined to cans of relatively large diameter, occurs because of some imbalance of torque forces introduced, for example, by irregularities of the slideway. Rotation may then result in misalignment between the articles and operating instrumentalities. In the apparatus of the aforesaid patent, for example, the soldering operation must be performed along the side seam of the articles and there is little tolerance to rotational misalignment of the can body at the soldering station.

Another problem in conveying such articles in stable axial succession may be presented where the articles are not securely confined in their desired path, for example, by suitable guide rails. In such circumstances, the articles are subject to lateral displacement either bodily or, if the displacement affects only one end of the article, to skewing.

It is accordingly an object of the present invention to provide apparatus for conveying tubular articles in axial succession along a predetermined path in which the stability of the articles during their movement in said path is enhanced.

It is another object of the present invention to provide apparatus of the foregoing type in which the articles being conveyed along the path are stabilized against tumbling.

It is another object of the present invention to provide apparatus of the foregoing type in which the articles during their movement along the path are stabilized against axial rotation.

It is yet another object of the present invention to provide in apparatus of the foregoing type means for stabilizing the articles being moved along the path against lateral displacement or skewing.

2

To these ends and in accordance with a feature of the present invention, there is provided, in apparatus for conveying tubular articles in coaxially related succession along a predetermined path of travel, said apparatus comprising a conveyor chain having spaced drive links, means for movably supporting said chain to provide a run thereof along said path, drive lugs pivoted in said drive links, said lugs being formed with legs and being rotatable into and out of an operative disposition in which said legs extend transversely of said path for driving engagement with said articles in said path, and means for positioning and maintaining said lugs in their operative disposition during movement of said links between a receiving station and a discharge station along said path, in combination therewith, projections extending from said legs and directed, in said operative disposition, along said path in spaced relation with said links for receiving end edge portions of said articles between said links and said projections.

Where the instability problem is simply tumbling and does not include lateral instability or rotation, the projections are directed one way, i.e., rearwardly, in the operative disposition of said lugs to provide a ledge for supporting the following can body should it start to tumble forwardly. In accordance with a further feature of the invention, cam means are provided at the discharge station cooperative with cam surfaces of the drive lugs for rotating the lugs to move the projections forwardly out of supporting relation with the can bodies.

In supporting the articles against rotation, in accordance with another feature of the present invention, means are provided for positioning and maintaining clamping engagement of end portions of the articles between drive links and projections during movement of the drive links between the receiving and the discharge stations. Such clamping engagement is not required to prevent tumbling but where it is provided for stability against rotation, it also provides stability against tumbling.

Preferably such clamping engagement for stabilizing articles against rotation will be provided by engagement of the articles between the drive links and rearwardly directed projections of the drive lugs inasmuch as clearance of such projections from the articles at the discharge station may be accomplished merely by effecting rotation of the drive lug. On the other hand, where the clamping engagement is effected between the drive links and forwardly directed projections, in order to provide clearance between the articles and the projections at the discharge station, the articles must be accelerated at that station to move them forwardly relative to the drive lugs.

However, circumstances occur in which it is necessary or desirable to employ projections extending both forwardly and rearwardly of the legs of the drive lugs. As an example, in the apparatus of the aforesaid patent there is a portion of the feed path in which the can bodies ride on a lap depressor chain and are not securely supported against lateral displacement or skewing. In such circumstances, in accordance with the present invention, it is desirable to support the articles at both ends by projections extending both forwardly and rearwardly from the legs of the drive lugs. Desirably also in preventing rotational displacement of the articles, lug positioning means are provided for maintaining clamping engagement between the drive links and certain projections during movement of the drive link from the receiving to the discharge station.

Accordingly, in accordance with the further feature of the present invention, there is provided, in apparatus of the foregoing type, including a conveyor chain having drive lugs pivoted thereon, the drive lugs having legs adapted to be disposed in operative disposition for engagement with end portions of articles in the predetermined path of travel, of a pair of projections extending, in the operative disposition of the lugs, from each leg in spaced relation with the associated drive link, one projection extending forwardly and the other rearwardly from said leg for receiving edge portions of the articles between the link and said projections, means operative at a receiving station for positioning the lugs in operative disposition and for maintaining clamping engagement of an edge portion of an article between each drive link and a projection of the associated lug during movement of the drive link between the receiving station and a discharge station. Suitably the apparatus also comprises means at the discharge station for accelerating the articles to clear them from the forwardly extending projections, and means for camming the lugs to clear the rearwardly extending projections from the articles.

Other features and advantages of the invention will best be understood from the following description taken together with the accompanying drawings in which:

BRIEF DESCRIPTION OF THE DRAWINGS

FIG. 6 is a section taken on line VI–VI of FIG. 1;

FIG. 7 is a partial view partly in section and on an enlarged scale of the apparatus shown in FIG. 1;

FIG. 8 is a partial view of a modification on a scale corresponding to FIG. 4;

FIGS. 9, 10 and 11 are partial views on an enlarged scale of another modification.

DESCRIPTION OF THE PREFERRED EMBODIMENTS

Referring to FIGS. 1 through 7 of the drawings, the invention is illustrated as embodied in a side seam soldering machine of the type disclosed in the aforesaid patent.

Figure 1:
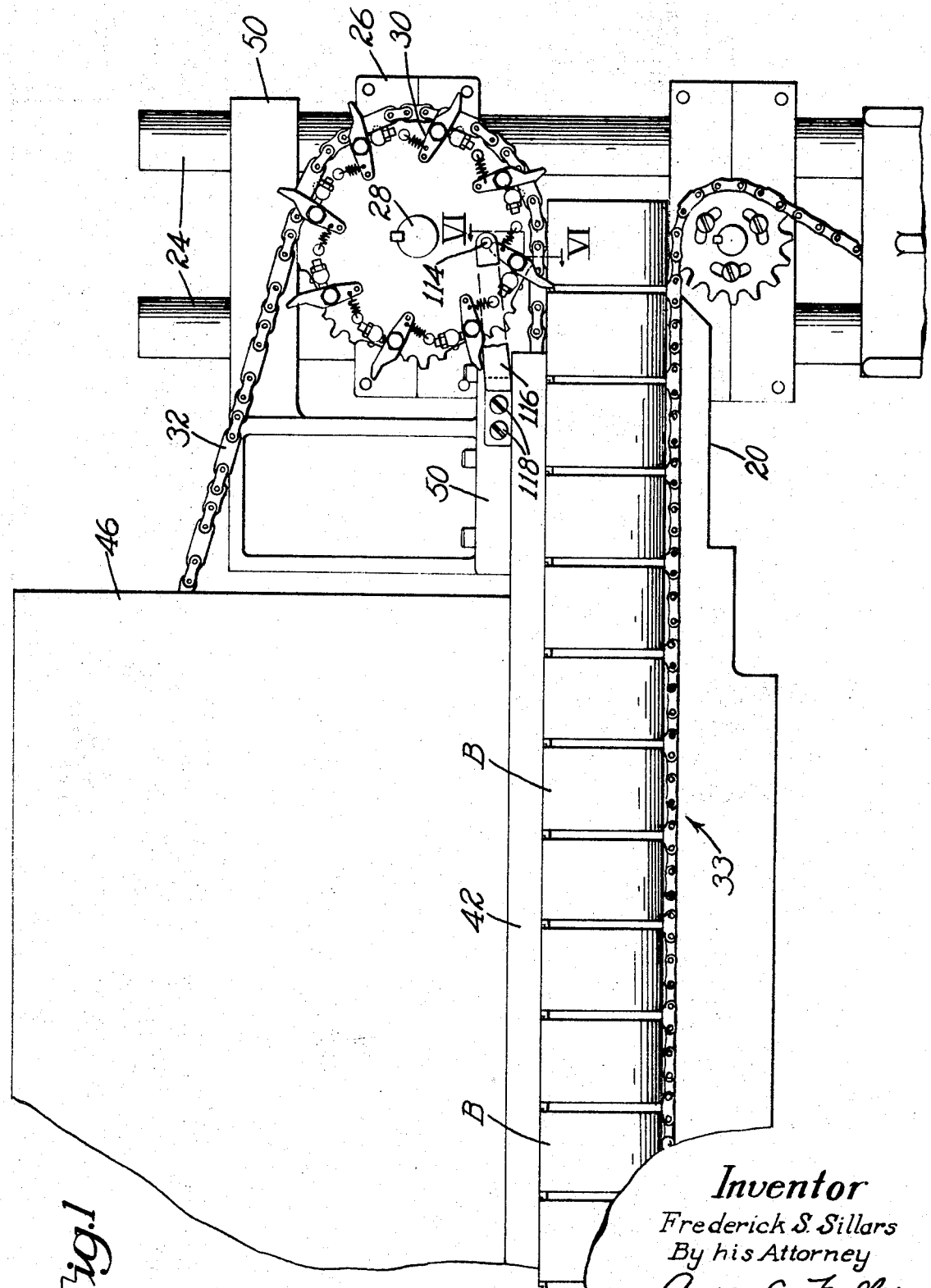
FIG. 1 is a side elevation of a portion of illustrative apparatus embodying the present invention.

The illustrative machine comprises a base 20 generally in the form of an elongated, horizontally disposed channel supported at front and rear ends by legs (not shown). At each end of the base, a pair of vertically disposed support columns is carried thereby. At the front end of the machine, shown in FIG. 7, only one of the columns is shown identified by reference numeral 22. In FIG. 1 showing the rear end of the machine, the pair of columns is indicated by reference numeral 24. On the latter pair of columns is clamped a rear support bracket 26 in which is journaled a drive shaft 28 arranged to be driven by a main drive shaft (not shown). On the shaft 28 is keyed a sprocket 30 carrying a conveyor chain 32 at the rear end of a horizontal run extending along the path of movement of the can bodies B. This end constitutes a discharge station at which the can bodies are ejected from the machine after transiting a portion of the path in which special links of a lap depressor chain 33 apply pressure to lap areas of the bodies after soldering.

Referring to FIG. 7, at the front end of the machine a front support bracket 34 having a boss 36 in which the front column 22 is journaled, is adjustably supported. In the bracket 34 is journaled a shaft 38 carrying an idler sprocket 40. This sprocket supports the conveyor chain 32 at the front or receiving station end of the lower horizontal run of the conveyor chain. In this run the chain is supported in a chain guide 42 which slidingly engages pins 44 (FIG. 6) of the chain. The guide 42 is supported in turn by a chain guide bridge 46.

Referring now to FIGS. 2 to 5, the conveyor chain includes spaced drive links 60 of substantially the same height as the other chain links in which are pivoted unitary drive lugs 62. The lugs 62 are formed with generally T-shaped legs 64 and cam surface portions 66.

After the moving conveyor chain meshes with the idler sprocket 40 (FIG. 7), the legs 64 of the chain lugs 62 are retracted by engagement with a lug guide 68 carried by the front support bracket 34 and are maintained in retracted positions as they pass around the remainder of the idler sprocket first by the lug guide and then by a lug guide spring 70, the cam surface portions being received in pockets 69 of the sprocket. Adjacent the end of the guide spring, the cam surface portions 66 encounter the upper surface portion 72 of the fixed chain guide 42 whereby upon further movement of the conveyor chain, the legs are rotated with respect to the drive links to an operative disposition with the legs 64 thereof extended for engagement with the trailing end portions of cam bodies. In the normal operation of the illustrative machine, the can bodies B are delivered by the rear extractor finger of a conventional bodymaking machine in timed coordination with the movement of the conveyor chain so that the trailing edges of the can bodies are engaged at a receiving station by the legs of the can bodies as they are turned down by the lug positioning edge of the chain guide.

FIGS. 2 through 5, showing mechanism of the illustrative apparatus at the drive sprocket in successive positions, serve also clearly to illustrate a feature of the present invention whereby the drive lugs 62 are formed to stabilize the can bodies during their movement between the receiving and the discharge stations. To this end, each drive lug 62 has a fixed projection 80 extending rearwardly, i.e., to the left as viewed in FIGS. 2 through 5, from the leg 64 in the operative disposition of the lug. In such disposition, the projection 80 is adapted to extend in spaced relation with its associated drive link 60, and is formed with a slight bevel 82 to facilitate reception of the forward edges of can bodies. In transit the projection 80 provides a ledge for supporting such edges in case the can bodies should start to tumble.

In accordance with a further feature of the present invention, the lugs 62 are formed additionally with forwardly directed fixed projections 84 arranged for clamping trailing edge portions of can bodies to provide rotational stability and to cooperate with the rearwardly directed projections in providing stability against displacement. Thus, referring to FIGS. 1–7, the projections 84 are adapted, in the operative disposition of the lugs 62, to extend forwardly in spaced relation or, upon slight rotation of the lug, in clamping relation with their associated drive links 60.

In supporting the can bodies against rotational instability, rotation of the drive lugs 62 by engagement of their cam surface portions 66 with the edge 72 of the chain guide 42, as previously described, is operative to position the lugs for clamping engagement of the trailing edge portions of the can bodies between the drive links and the rearward projections 84. This clamping engagement is maintained by the chain guide during movement of the drive links between the receiving and the ejection stations. At the ejection station, means now to be described are provided for separating the can bodies and the drive lugs by forwardly accelerating the can bodies along the predetermined path after the clamping engagement of the forward projections has been relieved by passage of the drive lugs beyond the chain guide.

Figure 2:
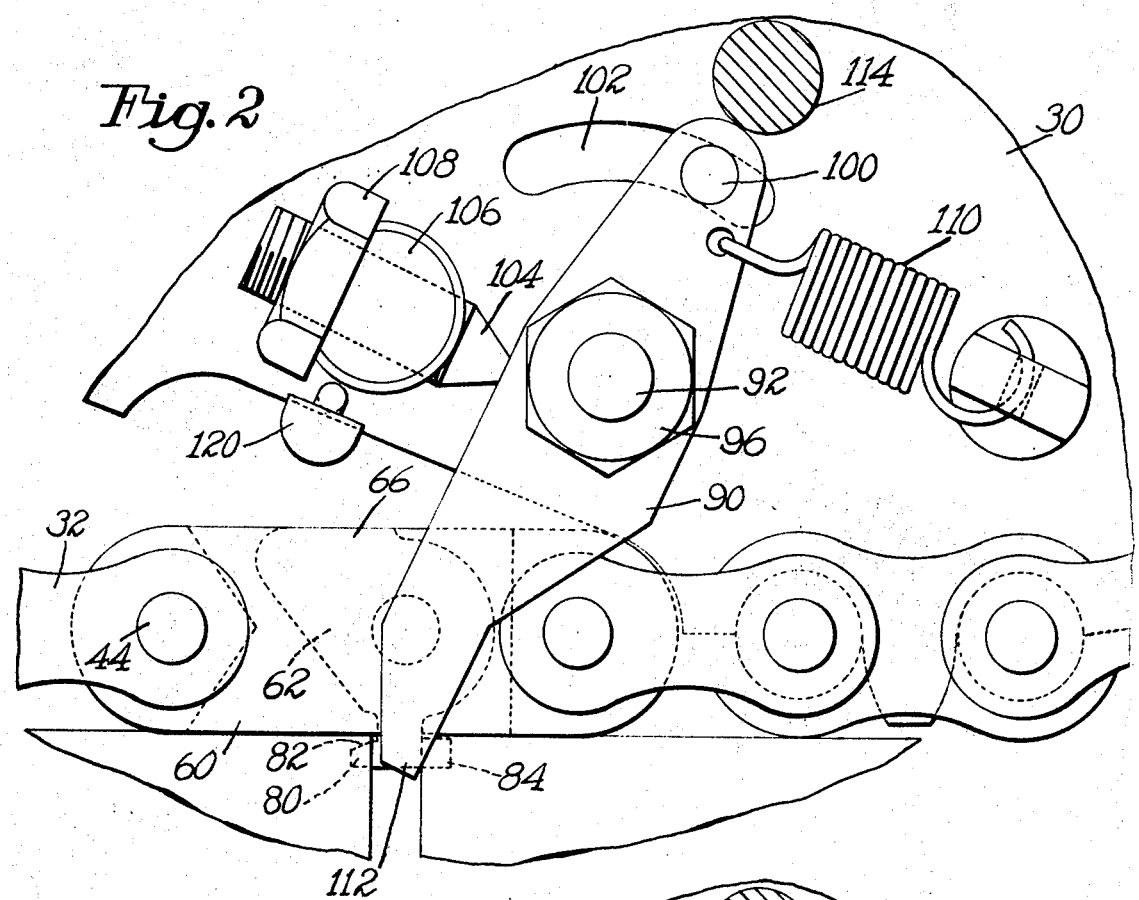
FIGS. 2, 3, 4 and 5 are partial views on a greatly enlarged scale of a portion of the apparatus.
Figure 3:
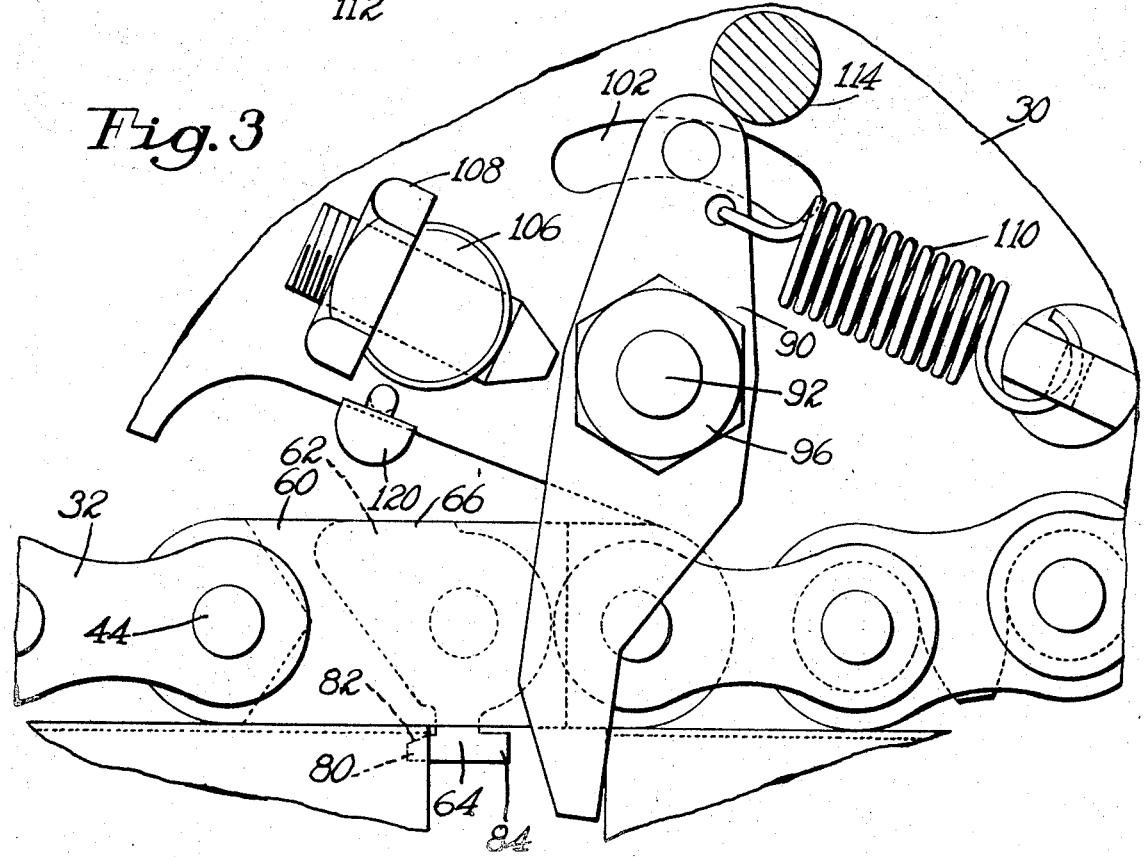
Figure 4:
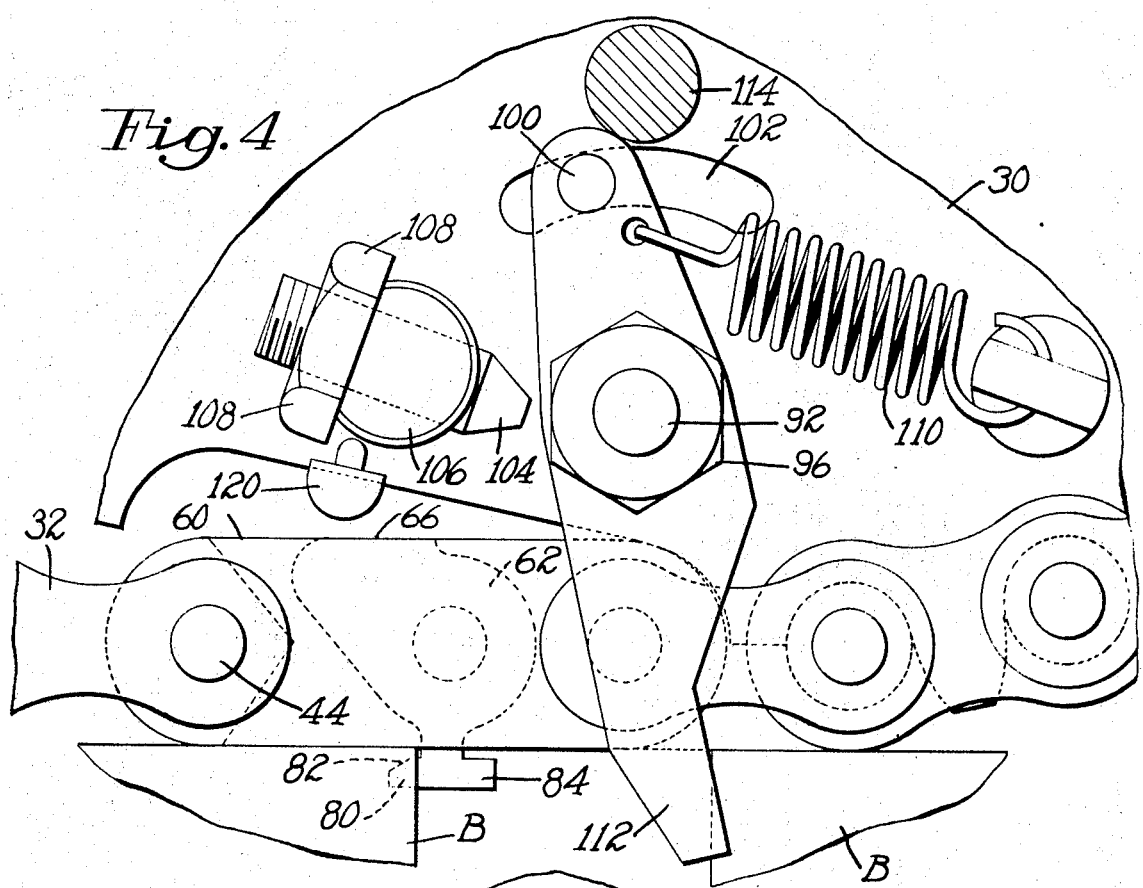
Figure 5:
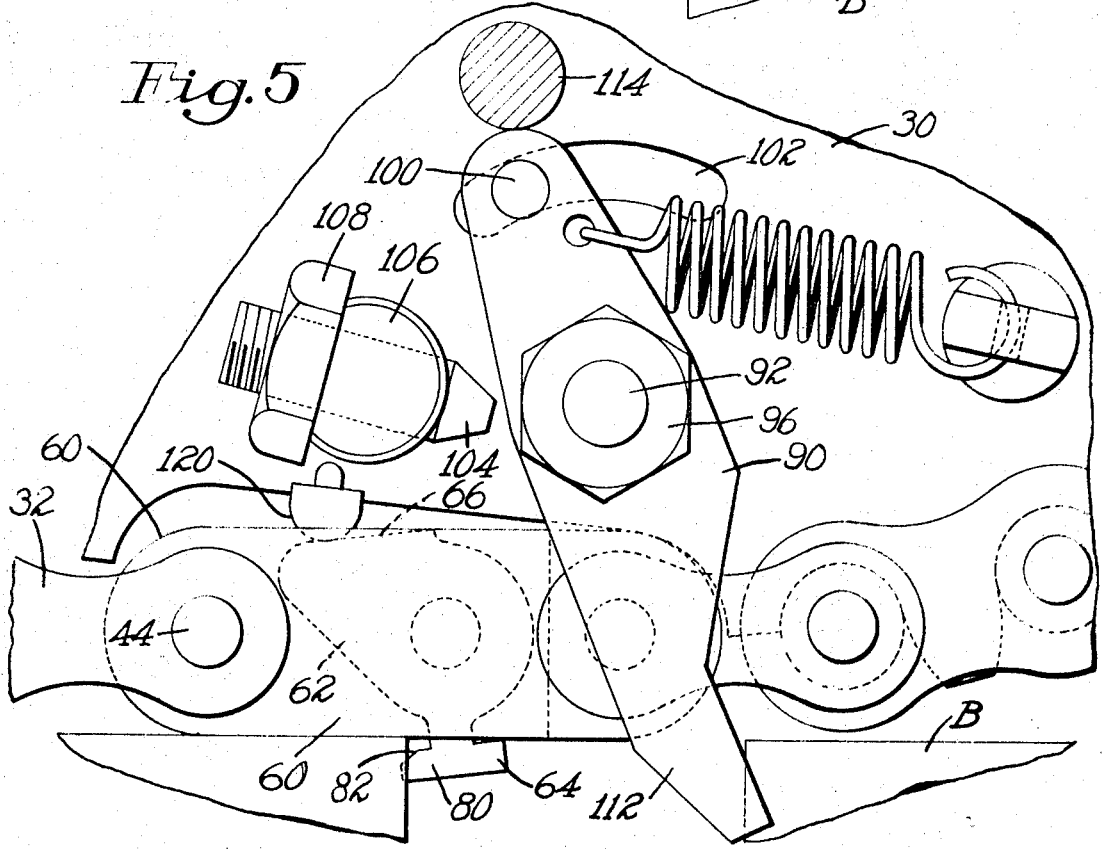

Accordingly, a plurality of pairs of accelerating levers 90, 90' (FIG. 6) is carried by the sprocket 30, members 90 of the pairs being mounted on one side of the sprocket and members 90' on the other. Each pair is pivoted on a threaded stud 92 which passes horizontally through the sprocket. The accelerating levers are supported on the studs 92 spaced from the sprocket by bushings 94 and retained by nuts 96. Washers 98 between the nuts and the levers permit the latter to swing freely, the members of each pair being connected for rocking together by connection of their inner ends by pins 100 which pass through arcuate slots 102 in the sprocket. Each pair of levers is yieldingly retained in a rest position determined by a stop screw 104 passing through a stud 106 and retained by a lock nut 108. Springs 110 connected between the sprocket and the upper ends of the levers 90 urge the latter into said rest position. The accelerator levers 90, 90' have outer ends 112 extending beyond the periphery of the sprocket and the pairs of levers are spaced circumferentially around the sprocket in such a manner that the ends 112 engage the trailing edges of the can bodies at the discharge station as the associated drive links 60 reach the sprocket (FIG. 2). At this time, the chain has issued from the chain guide so that the projections 84 are not held in clamping engagement with the can bodies. The pairs of levers 90, 90' are actuated to accelerate the bodies to move them out of engagement with the projections 84 by the engagement of the inner ends of the levers 90 with a pin 114 carried by an arm 116 (FIG. 1) secured by screws 118 to the bridge bracket 50. As will be seen from the successive FIGS. 2 through 5, the effect of such engagement is to rock the levers and thereby effect acceleration of the can bodies clear of the drive lugs.

Means are also provided in accordance with the feature of the present invention, for effecting rotation of the drive lugs at the discharge station to move the rearwardly directed projections 80 forwardly out of the leading edge portion of the can bodies. Where there are also forwardly directed projections of the lugs, this operation takes place following acceleration of the can bodies clear of the latter projections.

For rotating the drive lugs as aforesaid, the sprocket 30 is provided with a plurality of cams 120 circumferentially spaced about the periphery of the sprocket for engagement with the cam surface portions of the drive lugs 62. As will be seen from FIG. 5, these cams are operative at the discharge station for rotating the drive lugs to move the rearwardly directed projections forwardly out of supportive engagement with the can bodies. In the illustrative apparatus, the can bodies thereafter are supported by the lap depressor chain 33 in traveling to the point at which the accelerating levers eject them from the machine.

In certain circumstances of conveying tubular articles, such as where the articles are not subject to rotational instability but where there still exists danger of tumbling, it is desirable to omit the forwardly directed projections together with the accelerating lever means. This modification is illustrated in FIG. 8.

In other circumstances of conveying tubular articles where the articles are subject to rotational instability but are so adequately supported in their path of travel as not to require support at both ends in transit, a modification shown in FIGS. 9, 10 and 11 is preferred. Herein, drive lugs 262 are provided with rearwardly directed projections 264 only while means are provided for effecting clamping of bodies B thereby. As shown in FIG. 9, the lug 262 has left and right cam surface portions 266 and 268 respectively. These are conformed for cooperation with the bottom surface of the chain guide 42 in an initial portion having a raised surface for positioning the lug loosely in its operative position with the projection in spaced relation with the drive link for receiving the edge portion of a body. Then, after the drive link has moved along the chain guide to the point where a can body is received from the bodymaker (FIG. 10), said bottom surface of the guide is lower at this point for camming of the lug by engaging the surfaces 266 and 268 to clamp the leading end of the can body between the rearward projection and the drive link. This position is then maintained by the chain guide while the drive link moves between the receiving and the discharge stations after which the cams 120 are operative (see FIG. 11) to effect disengagement of the drive lugs with the can bodies by engaging the portions 266 to rock the lugs 262 counterclockwise while the portions 268 are received in pockets 270 of the sprocket.

I claim:

1. In apparatus for conveying tubular articles in coaxially related succession, along a predetermined path, said apparatus including:
    a conveyor chain having spaced drive links, of substantially the same overall height as the other chain links, means for movably supporting said chain to provide a run thereof along said path;
    unitary drive lugs pivoted in said drive links, said lugs being formed with legs and being totally rotatable with respect to said drive links into and out of an operative disposition in which said legs extend transversely of said path for driving engagement with said articles in said path;
    fixed means for positioning and maintaining said lugs in their operative disposition during movement of said links between a receiving station and a discharge station along said path, in combination therewith;
    fixed projections extending from said legs and directed in said operative disposition, along said path in spaced relation with said drive links for receiving end portions of said articles between said links and said projections; and
    said positioning and maintaining means being operative during movement of said drive links between said stations additionally to effect clamping engagement, between said links and at least some of said projections, of end edge portions of said articles.

2. Apparatus as in claim 1 in which the fixed projections extend rearwardly in spaced relation with said drive links in said operative disposition.

3. Apparatus as in claim 2 in which said clamping engagement is between said links and said rearwardly extending fixed projections.

4. Apparatus as in claim 1 comprising fixed projections extending rearwardly in said operative disposition and additionally comprising means cooperative with cam surface portions of said lugs at said discharge station for rotating said lugs to move such projections forwardly out of said articles.

5. An apparatus as in claim 1 comprising projections extending forwardly from said legs in said operative disposition to effect clamping engagement between said links and at least some of said projections of end portions of said articles; and additionally comprising means cooperative at said discharge station for forwardly accelerating said articles along said path to clear them from such projections.

6. Apparatus as in claim 1 in which projections extend from each leg forwardly and rearwardly in said operative disposition, said rearwardly extending projections being in fixed relation to said leg.

7. Apparatus as in claim 6 and additionally comprising at said discharge station means operative for forwardly accelerating said articles along said path clear of said forwardly extending projections and means cooperative with cam surface portions of said lugs for forwardly rotating said lugs to move said rearwardly extending projections out of supporting relation with said articles.